March 17, 1970     R. A. PETERSON     3,501,095
HOT AIR HEATING APPARATUS FOR TRACTOR
Filed March 13, 1968
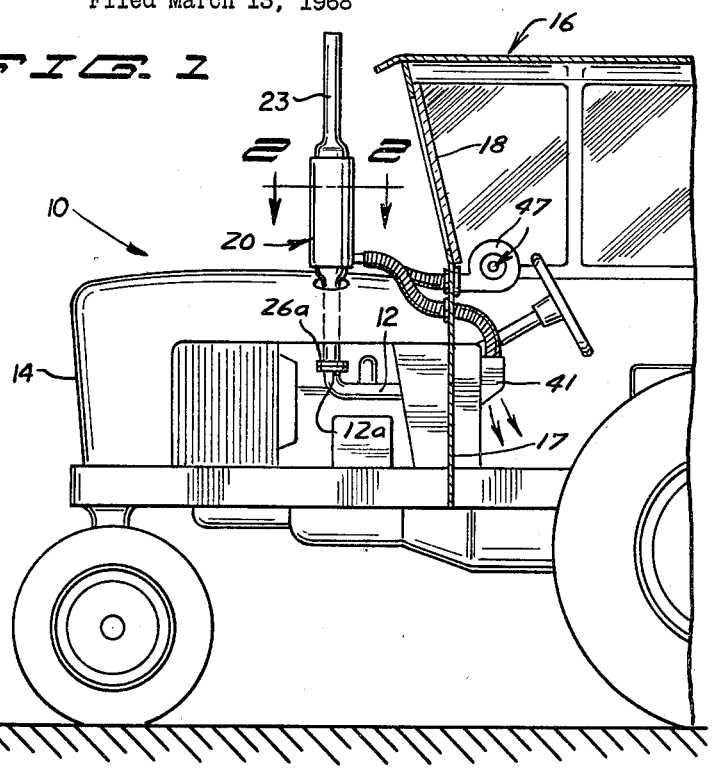
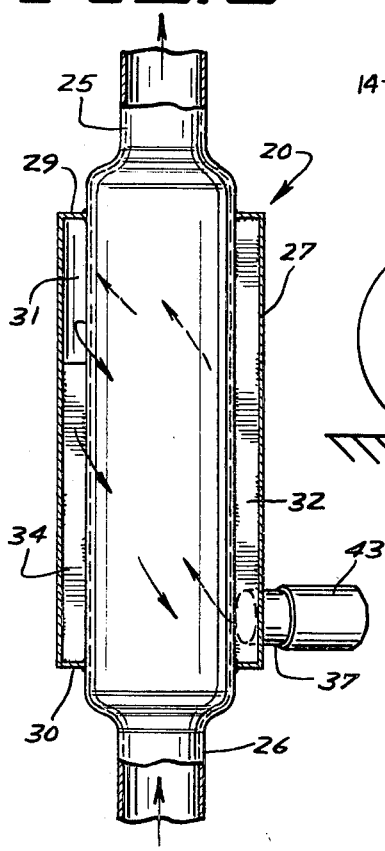
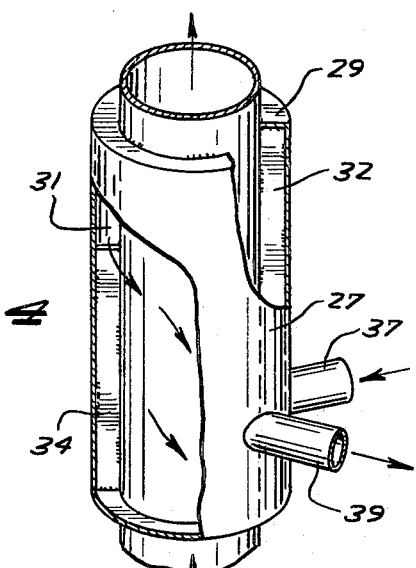
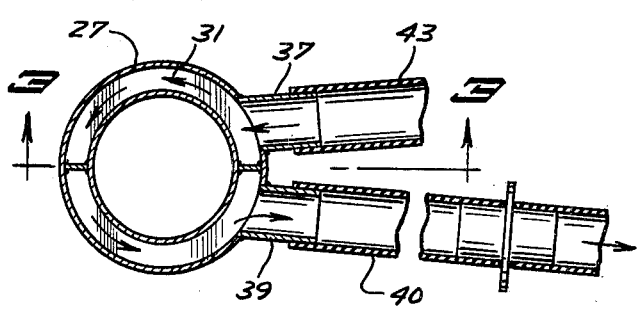
INVENTOR.
RANDALL A. PETERSON United States Patent Office 3,501,095
Patented Mar. 17, 1970

3,501,095
HOT AIR HEATING APPARATUS FOR TRACTOR
Randall A. Peterson, R.R. 1, Dassel, Minn. 55325
Filed Mar. 13, 1968, Ser. No. 712,814
Int. Cl. B60h 1/18
U.S. Cl. 237—12.3                                   1 Claim

ABSTRACT OF THE DISCLOSURE

A hot air heating apparatus for a cab equipped farm tractor type of vehicle consisting of an integral structure comprising a muffler for the tractor forming an air heating chamber, lines connecting said chamber and the cab of said tractor and a fan moving air through said lines and chamber into said cab.

BACKGROUND AND SUMMARY OF THE INVENTION

A farm tractor type of vehicle does not operate at a sufficient motor speed to provide heat from the normal liquid cooling system of the motor and in an air cooled vehicle auxiliary heating means would be required. It is desirable to have heat supplied by operation of the motor within a few minutes after the commencement of the operation of the tractor. The exhaust manifold generates a great deal of heat rapidly and at the point where the muffler is joined to the exhaust manifold outlet the heat generated is on the order of 1200 degrees F. The purpose of the invention herein is to utilize this heat by means of a simple and efficient apparatus to heat the cab of the tractor.

Effort has been made to utilize engine heat by means of the motor fan driving the air through a conduit as indicated in U.S. Letters Patent No. 2,920,829 issued to Shaw, but here it would appear that the air would be contaminated by engine odors and there would not be as high a degree of heat available as at the exhaust manifold.

Gasoline heaters have been provided commercially, but these have not had good acceptance.

It is an object of the invention herein to provide a simple and efficient heat exchange apparatus to utilize the heat present within the muffler of a tractor to heat the cab of the tractor.

It is a further object of the invention herein to provide a heat exchange unit integral with the muffler of a tractor and means for conducting heated air to the cab of said tractor.

More specifically it is an object of this invention to provide a jacket to be disposed about and be integral with a muffler for a tractor forming an air chamber therebetween and conductors including a fan circulating heated air through the cab of said tractor.

These and other objects and advantages of the invention will be set forth in the following description made in connection with the accompanying drawings in which like reference characters refer to similar parts throughout the several views and in which—

FIG. 1 is a broken view in side elevation and partially in section showing the invention herein in operating position;

FIG. 2 is a view in horizontal section on an enlarged scale taken on line 2—2 of FIG. 1 as indicated;

FIG. 3 is a view in vertical section on an enlarged scale taken on line 3—3 of FIG. 2 as indicated; and FIG. 4 is a view in perspective on an enlarged scale of a major portion of the invention herein with portions thereof being broken away.

DESCRIPTION OF A PREFERRED EMBODIMENT

Referring to the drawings, a conventional type of tractor is indicated generally by the reference numeral 10. Of particular interest thereof with reference to the invention herein is an exhaust manifold or exhaust pipe 12 having a terminal vertical extension disposed under the hood 14. Shown generally is a cab 16 having its forward wall formed by a fire wall 17 as a lower portion thereof and a windshield 18 thereabove.

Mounted to be upstanding from said exhaust pipe and integral therewith is the heat exchanger or heating device 20 of the invention herein. Said heat exchanger embodies in a unitary structure the equivalent of a tractor muffler and a jacket thereabout forming a heating chamber therebetween. Hence comprising said heat exchanger is an elongated tubular member 23 formed of suitable material to withstand the corrosive effect to which a muffler is subjected and which forms an exhaust member for the passage of exhaust gases to the atmosphere. The baffle structure within said member 23 will be conventional and is not here shown. Said member has end portions 25 and 26 of reduced diameter. The lower end portion 26 extends downwardly sufficiently to engage in an abutting relationship the exhaust pipe 12. Said end portion 26 and said exhaust pipe 12 will have conventional flat annular flanges 26a and 12a at their ends, which flanges will be bolted together in facing relationship and will have a suitable seal or gasket therebetween.

Surrounding the major portion of said member 23 is an enclosing member or jacket 27 having annular end walls 29 and 30 engaging said member 23 and made integral therewith as by welding. Thus formed between said member 27 and said member 23 is a chamber 31 which forms a heating chamber.

Extending the full height of said chamber is a partition or baffle 32. Diametrically opposite said baffle 32 within said chamber is a partition or baffle 34 which extends upwardly for a substantial distance of the height of said chamber but short of the full height thereof.

Adjacent the bottom of said chamber at one side of said baffle 32 is an inlet 37 formed as a short nipple. At the other side of said baffle 32 is an outlet 39 also formed as a short nipple.

Running from the outlet 39 through the fire wall 17 and into said cab is a suitable flexible conduit or hose 40 terminating in a conventional type of heat register 41 which will be equipped with appropriate baffles to adjustably control and deflect the heat passing therethrough. Said register may be conveniently mounted at a lower portion of the dashboard of the cab or therebelow.

A second conduit or hose 43 extends from the inlet 37 through the fire wall 17 to a suitable location within said cab, such as on or below the dashboard of said cab. Said line has means 47 for moving air from within the cab into said line 43. Said air moving means is shown here as a drum type of blower.

OPERATION

A quick acting and highly efficient heating apparatus for a tractor cab has been above described.

With the tractor in operation, heat generated by the engine of the tractor is on the order of 1200 degrees F. in the exhaust manifold and at the lower portion of the heating chamber 31. The heat dissipates rapidly as the exhaust gases pass upwardly through the member 23. The temperature at the uper portion of said chamber 31 may be on the order of 600 degrees F. It is estimated that it takes about five minutes of engine operation for the temperature indicated to be reached.

Once the tractor engine is operating, the blower 47 will be turned on to move air from within the cab outwardly through the line 43 into the chamber 30 through the inlet 37. This air in moving around the chamber 30 takes a circuitous path upwardly and over the baffle 34 into the exhaust side of the chamber 30 and then downwardly to pass outwardly of the outlet 39 and through the line or hose 40 into the cab 17. The air passing into the hose 40 may have a temperature on the order of 120 degrees F. The temperatures indicated are reached with the engine idling. With the tractor in motion at a working speed, the temperature of air moving into the line 40 may reach on the order of 200 degrees F.

The blower is preferably used to push air through the heating circuit rather than drawing it through as the air at the temperature at which it leaves the chamber 31 may possibly adversely affect the blower. There is ample leakage of air into the cab from the atmosphere to introduce fresh or new air into the heating circuit.

The heat deflector may be adjusted to control the supply of heated air entering the cab.

Thus it is seen that there has been provided an efficient quick acting hot air heating apparatus for a tractor cab. The apparatus has proved to have very satisfactory performance.

It will of course be understood that various changes may be made in the form, details, arrangement and proportions of the parts, without departing from the scope of the invention herein which, generally stated, consists in an apparatus capable of carrying out the objects above set forth, in the parts and combinations of parts disclosed and defined in the appended claim.

What is claimed is:

1. A unitary heating apparatus for a tractor having in combination,
    an elongated tubular member having end portions of reduced diameter and having one end thereof connected to and upstanding from the exhaust pipe of said tractor,
    a tubular jacket disposed about a substantial portion of said member forming an annular chamber therebetween, said jacket having end wall portions integral with said tubular member,
    a baffle member the full width of said chamber extending the full height thereof,
    a second baffle member the full width of said chamber extending upwardly for a partial distance of the height thereof and being diametrically opposed to said baffle member,
    said jacket having an inlet into said chamber adjacent the bottom thereof and adjacent one side of said first mentioned baffle member, said jacket having an outlet therein from said chamber adjacent the bottom thereof and adjacent the other side of said first mentioned baffle member,
    conduits running from said inlet and said outlet into the cab of said tractor,
    said conduit from said inlet having an air moving means at its terminal portion within said cab to draw air from said cab into said chamber, and
    means at the terminal portion within said cab of said conduit from said outlet regulating the movement of air therefrom.

References Cited

UNITED STATES PATENTS

| | | |
|---|---|---|
| 1,597,048 | 8/1926 | Bovey. |
| 1,755,924 | 4/1930 | Keagle. |
| 2,175,280 | 10/1939 | Paton. |
| 2,302,416 | 11/1942 | Brooks. |

EDWARD J. MICHAEL, Primary Examiner

U.S. Cl. X.R.

165—51